(12) United States Patent
Marmash et al.

(10) Patent No.: US 7,328,296 B1
(45) Date of Patent: Feb. 5, 2008

(54) INTERRUPT PROCESSING SYSTEM

(75) Inventors: Naser Marmash, Ashland, MA (US); Avinash Kallat, Marlborough, MA (US); Brandon L. Paul, East Douglas, MA (US); Mark Botello, Mansfield, MA (US); Andrew Kniager, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 69 days.

(21) Appl. No.: 11/324,695

(22) Filed: Jan. 3, 2006

(51) Int. Cl.
*G06F 13/24* (2006.01)

(52) U.S. Cl. .............. 710/269; 710/268; 710/262; 710/240

(58) Field of Classification Search ........ 710/260, 710/263, 268; 700/213; 709/220; 719/316
See application file for complete search history.

(56) References Cited

U.S. PATENT DOCUMENTS

| | | | | |
|---|---|---|---|---|
| 5,988,857 A * | 11/1999 | Ozawa et al. | .............. | 700/213 |
| 6,401,153 B2 * | 6/2002 | Pawlowski | .............. | 710/260 |
| 6,697,878 B1 * | 2/2004 | Imai | .............. | 719/316 |
| 6,968,411 B2 * | 11/2005 | Gaur et al. | .............. | 710/260 |
| 7,103,646 B1 * | 9/2006 | Suzuki | .............. | 709/220 |
| 2005/0228922 A1 * | 10/2005 | Tsao et al. | .............. | 710/268 |
| 2006/0149878 A1 * | 7/2006 | Carmichael et al. | .............. | 710/263 |

\* cited by examiner

*Primary Examiner*—Christopher E. Lee (57) ABSTRACT

An interrupt processing system having an interrupt holding registers, each corresponding to a different class of interrupts. A write queue posts servicing required by the interrupt holding registers. An interrupt vector register has bit positions corresponding to different classes of interrupts. A read queue has inputs coupled to the plurality of interrupt holding registers and to the interrupt vector register. Detection logic is coupled between an arbiter, fed by the write and read queues, and a processor for: (a) indicating when an interrupt has passed from the write arbiter to the processor; (b) detecting the interrupt class of such passed interrupt; (c) enabling the one of the bit positions corresponding to the detected interrupt class in the interrupt vector register to store a state indicating the servicing requirement for such detected class of interrupt; and (d) wherein the data stored in the interrupt vector register is passed to the processor through the read queue and the arbiter selector.

1 Claim, 7 Drawing Sheets

INTERRUPT PROCESSING SYSTEM

TECHNICAL FIELD

This invention relates generally to interrupt processing systems and more particularly to Message Signaling Interrupt (MSI) processing systems.

BACKGROUND

As is known in the art, various devices or programs (herein collectively referred to as an interrupt source or sources) generate interrupts to notify a CPU of various events, such as the requirement to service an interrupt. An interrupt may be described as a signal from the interrupt source that causes the CPU to stop current processing and handle, i.e., service, the interrupt. One technique used to signal interrupt events to the CPU is through Message Signal Interrupt (MSI)/MSI-X based interrupts. Here, the interrupt source sends the interrupt message with an associated interrupt ID.

More particularly, there may be many interrupt classes or types in the system. Each interrupt class is represented by one MSI_X interrupt ID. Fatal interrupt, non-fatal interrupt, "data-movement-done" interrupt are few examples of interrupt classes. Each interrupt class (say fatal interrupt) may be generated by one, or more interrupt sources. Each interrupt source corresponds to a bit in the interrupt holding register. Thus, for a system having a plurality of N classes of interrupts and M potential interrupt sources there would be N interrupt holding registers, each holding the interrupts for a corresponding one of the N interrupt classes and each bit in each one of the N holding registers corresponding to one of the M interrupt sources.

As is also known in the art, Message Signaled Interrupts (MSI_X) is a feature in computing systems that enables devices in the system to request service from the system CPU by writing messages to location addresses based on the class of service requested. MSI_X is a posted write operation that shares the same queue as a normal posted writes from IO device to the CPU controller, namely "posted write queue". For various reasons (e.g, high performance 10 devices), read responses to the CPU could have a separate queue namely "read response queue". Both these queues are arbitrated for, by the, "merge queue arbiter" before being placed in the "merge queue" destined to the CPU. In such an environment, potential ordering/coherency issues could arise when read responses could get ahead of posted write requests including MSI_X writes. When an interrupt event occurs, the corresponding bit(s) in the interrupt holding register would be asserted and that would trigger the logic to schedule an MSI_X posted write into the "posted write queue". When software reads the interrupt holding register, the potential of reordering interrupt holding register read response ahead of the posted MSI_X interrupt message write request could result in a ghost interrupt flagged to the processor due to this reordering.

Figure 1:
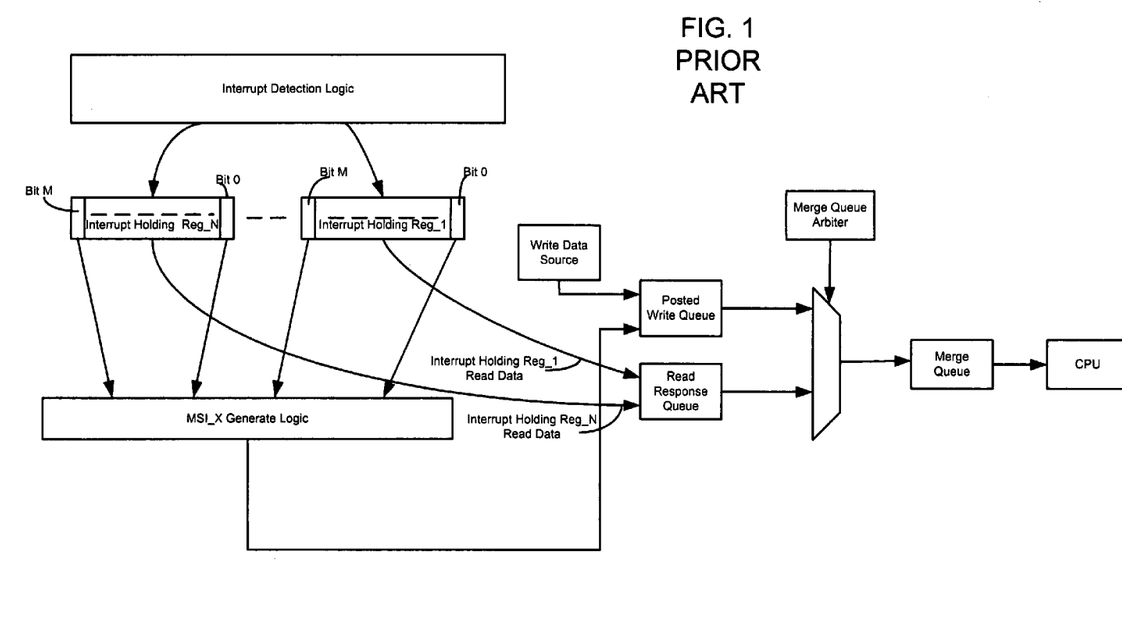
FIG. 1 is a diagram of an interrupt processing system according to the PRIOR ART.

More particularly, and referring to FIG. 1, a system is shown that supports MSI_X messaging to service interrupts from a plurality of different interrupt sources. Interrupt detection logic is provided to detect and direct the interrupt sources into various interrupt holding registers to facilitate hardware and software interrupt management. From the system perspective, each interrupt source/event has to be uniquely identified (i.e., assigned a unique name, or a unique ID). In the MSI_X case, each interrupt source/event is given a unique interrupt ID. In FIG. 1, reg_0 has M+1 interrupt source bits and each of these bits would represent an interrupt source/event that is uniquely identified by an MSI_X interrupt ID.

In FIG. 1, the data in the N holding registers are fed to an MSI_X generate logic. The MSI_X generate logic schedules (i.e., post) these interrupts to a write queue. For example, if three inputs to the MSI_X generate logic are set; i.e., here a logic 1, at the same time, say one from reg_0, another from reg_1 and a third from reg_2, the MSI_X generate logic would post reg_0 interrupt to the write queue, followed by reg_1 message, then reg_2 message, for example.

The output of the MSI_X generate logic along with write data to be processed by the CPU are fed to the posted write queue (e.g., a FIFO). Note that the posted write queue holds interrupts as well as normal data traffic. Read response queue holds the read response for reads by the CPU from the interrupt holding registers. Both of these queues have to arbitrate to get access to the merge queue. A merge queue arbiter provides arbitration between the posted write queue and the read response queue for access to the CPU.

In FIG. 1, It should be noted that the reading by the CPU of the interrupt holding registers is asynchronous with the interrupt vectors being posted through the write queue to the CPU. It is also noted that with this arrangement, the write queue may receive an interrupt that, for example, ID 200, indicating holding regal, has an interrupt that needs servicing. However, because of the arbitration, that interrupt may get "stuck" in the write queue (i.e., may not passbe read from the write queue for servicing by the CPU until after the CPU has read the read queue). Thus, because of the asynchronous operation of the CPU in reading the read queue with respect to the write queue, the CPU may receive the information from the read queue for, in this example, reg_1 before the interrupt for that register passes from the write queue to the CPU. Thus, if the CPU services the interrupt event based on the data it received from the read queue and then gets the interrupt from the write queue, the CPU may think, incorrectly, that reg_1 still has an interrupt to service when in fact the CPU has all ready served that interrupt. Thus, in such an environment, potential ordering/coherency issues could arise when read responses could get ahead of posted write requests including MSI_X writes.

As is also known in the art, one type of bus used for communicating with peripheral or Input/Output (IO) devices, such as hard disks, is a Peripheral Component Interconnect (PCI) bus. According to PCI specifications, an IO device that supports MSI_X functionality requires 16 bytes of information per MSI_X interrupt vector. This information is normally stored in an IO device memory array and used during the generation of an MSI_X message.

More particularly, and referring again to FIG. 1, as noted above, interrupt sources (e.g., an IO) are grouped into "N" interrupt holding registers, each interrupt holding register having "M+1" bits. Each interrupt source is directly connected to the MSI_X generation logic which is then mapped into a unique MSI_X vector. This approach would require the 10 device to support (M+1)*N MSI_X vectors. Such, however, increases the memory requirement for an IO device that supports a large number of interrupt sources; burdens the MSI_X generation logic in an IO device when handling and scheduling large number of simultaneous interrupt events; burdens the system interrupt controller (i.e., the processor) by having it to support a large number of MSI_X vectors; and increases the system traffic of MSI_X message writes to the system controller, since each interrupt event would result in an MSI_X message write.

SUMMARY

In accordance with the present invention, an interrupt processing system is provided, having interrupt holding registers, each corresponding to a different class of interrupts. A write queue contains posted interrupt vector IDs from the interrupt holding registers for interrupt sources/events requiring service. An interrupt vector register has bit positions corresponding to different classes of interrupts. A read queue has inputs coupled to the plurality of interrupt holding registers and to the interrupt vector register. Detection logic is coupled between an arbiter selector, fed by the write and read queues, and a processor for: (a) indicating when interrupt has passed from the arbiter selector to the processor; (b) detecting the interrupt class of such passed interrupt; (c) enabling the one of the bit positions corresponding to the detected interrupt class in the interrupt vector register to store a state indicating the servicing requirement for such detected class of interrupt. The data stored in the interrupt vector register is passed to the processor through the read queue and the arbiter selector.

With such an arrangement, because the interrupt vector register is updated after interrupts have passed from the write queue to the processor, such interrupt vector register stores the current state of the interrupts. When the processor reads the interrupt vector register, the processor thereby receives the current state of the pending interrupt class or classes.

In accordance with another feature of the invention, an interrupt processing system is provided having a plurality of interrupt holding registers, each corresponding to a different class of interrupts. The system includes a plurality of OR logics, each one of the OR logics corresponding to one of the plurality of holding registers. Each one of the OR logics is fed by the bits stored in the corresponding one of the plurality of holding registers. Each one of the OR logics forms a corresponding interrupt vector.

With such an arrangement, an IO device that supports a large number of interrupt sources/events is relieved from requiring a large memory structures when using the MSI_X interrupt mechanism. It is noted that according to PCI specification, an IO device that supports MSI_X functionality requires 16 bytes of information per MSI_X interrupt vector); the MSI_X generation logic is simplified when handling and scheduling large number of simultaneous interrupt events since interrupts are grouped into classes where each class is represented by a given MSI_X interrupt vector, the total number of vectors an IO device supports is relatively small compared to the number of interrupt sources/events; the number of MSI_X interrupt vectors needed to be supported by the system interrupt controller is also reduced; and the system traffic of MSI_X message writes to the system controller is also reduced since each interrupt class results in an MSI_X message rather than each interrupt source/event.

In accordance with still another feature of the invention, an interrupt processing system is provided having a plurality of interrupt holding registers, each one of such registers storing interrupts corresponding to a different one of a plurality of classes of interrupts, each one of such interrupt holding registers having a plurality of bits, each one of the bits corresponding to one of a plurality of interrupt sources, The system includes a plurality of OR logics, each one being coupled to the bits of a corresponding one of the plurality of a plurality of interrupt holding registers. The system includes an interrupt vector register, such register storing data having a plurality of bit positions, each one of the bit positions corresponding to a different one of the plurality of classes of interrupts, each one of the bit positions being fed by an output of a corresponding one of the plurality of OR logics, outputs from each one of the bit positions in the interrupt vector register are being fed as an input to the corresponding one of the plurality of OR logics.

With such an arrangement, duplicate interrupts of the same class are prevented from being sent to the processor after the initial notification of an interrupt event to the CPU, up until the CPU subsequently services this interrupt event, and then clears the corresponding bit in the interrupt vector register.

In one embodiment, an interrupt processing system is provided, having a plurality of interrupt holding registers, each one of such registers storing interrupts corresponding to a different one of a plurality of classes of interrupts, each one of such interrupts having a plurality of bits, each one of the bits corresponding to one of a plurality of interrupt sources. A plurality of OR logics is included, each one being coupled to the bits of a corresponding one of the plurality of a plurality of interrupt holding registers. An interrupt vector register is provided, such register storing data having a plurality of bit positions, each one of the bit positions corresponding to a different one of the plurality of classes of interrupts, each one of the bit positions being fed by an output of a corresponding one of the plurality of OR logics, outputs from each one of the bit positions being fed as an input to the corresponding one of the plurality of OR logics. Each one of the OR logics includes: an OR gate fed by: a plurality of leading edge detectors each one being coupled to the bits of a corresponding one of the plurality of a plurality of interrupt holding registers; a trailing edge detector coupled to the bit position coupled to such one of the OR logics.

With such an arrangement, speedy notification is guaranteed for new interrupt sources to the CPU via the interrupt vector.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 2:
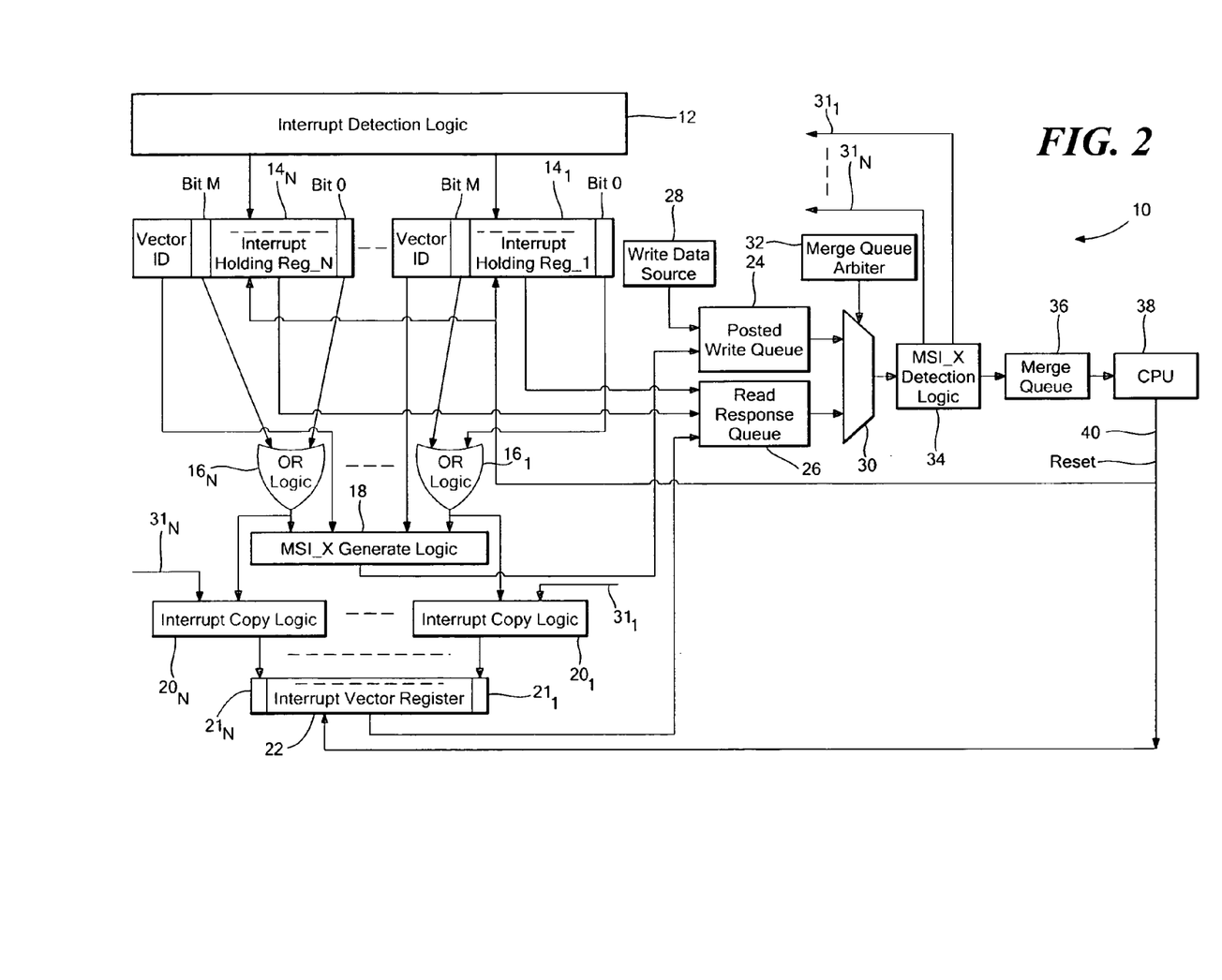
FIG. 2 is a diagram of an interrupt processing system according to the invention.

Referring now to FIG. 2, an interrupt system 10 is shown having: an interrupt detection logic 12; a plurality of, here N, interrupt holding registers $14_1$-14N; a plurality of N OR logics $16_1$-$16_N$; an MSI_X generate logic 18; a plurality of N interrupt copy logics $20_1$-$20_N$; an interrupt vector register 22; a posted write queue 24; a read response queue 26; a write data source 28; an arbiter selector 30; a merge queue arbiter 32; an MSI_X detection logic 34; a merge queue 36 and a processor, here a CPU, 38, as arranged as shown.

Briefly, the interrupt detection logic 12 is provided to detect and direct the interrupts from various interrupt sources, here total system interrupts are (M+1)*N sources not shown, into different interrupt classes, here N different classes, to facilitate hardware and software interrupt management. From the system perspective, each class has a unique identification indicia, i.e., assigned a unique name, or a unique interrupt ID.

Each separated interrupt class is stored in a corresponding one of a plurality of interrupt holding registers $14_1$-$14_N$. Each one of such interrupt holding registers $14_1$-$14_N$ has a plurality of, here M+1, bits, each one of the bits corresponding to one of a plurality of M+1 interrupt sources, not shown, and a field to store the interrupt ID associated with the holding register, namely interrupt vector ID. Thus, each one of the plurality of interrupt holding registers $14_1$-$14_N$ has M+1 interrupt source bits and all these bits would represent an interrupt class that is uniquely identified by the interrupt vector ID in a field of such register.

Each one of the M+1 bit interrupt sources/events stored in the interrupt holding registers $14_1$-$14_N$ is fed to a corresponding one of the OR logics $16_1$-$16_N$, respectively. The M+1 interrupt sources/events stored in the interrupt holding registers $14_1$-$14_N$ are also fed to the read request queue 26.

The Interrupt holding register: It is a register that only holds the state of the interrupt sources/events that are mapped to it. Software will read this register to further interrogate the source/sources of the interrupt. Once software has serviced the interrupt source/sources, it would clear/reset the bits accordingly. For every interrupt holding register (i.e., for very interrupt class), there is an interrupt ID field. This unique ID is sometimes called the interrupt vector ID. Interrupt vectors ID are fed to the MSI_X generate logic 18.

Each one of the OR logic $16_1$-$16_N$ is coupled to a corresponding bit position $21_1$-$21_N$, respectively, of the interrupt vector register 22. The OR gates $16_1$-$16_N$ are also connected to the MSI_X generate logic 18. The MSI_X generate logic is fed as an input to the posted write queue 24. Also fed to the posted write queue 24 is the write data source 28. The MSI_X generate logic 18 samples the outputs of the OR gates $16_1$-$16_N$ and the output of the interrupt vector IDs. If OR logic 1 is set (for example), then it would pick the contents of the vector ID in holding register 1 and would send the interrupt vector ID to the posted write queue 24.

The write queue 24 contains posted interrupt vector IDs from the interrupt holding registers $14_1$-$14_N$ for interrupt sources/events requiring service. The arbiter selector 30 is fed by the post write queue 24 and the read queue 26. The processor, i.e., CPU 38, is fed by the merge queue 36. The MSI_X detection logic 34 is coupled between the arbiter selector 30 and the merge queue 36 for indicating when an interrupt vector has passed from the posted write queue 24 to the processor 38 and for detecting the interrupt class of such passed interrupt vector ID. The MSI_X detection logic 34 detects the interrupt vector ID passed through the arbiter selector 30 and enables an interrupt copy logic $20_1$-$20_N$ corresponding to the detected interrupt vector ID to pass the earlier detected state transition of the output of the corresponding one of the OR logics $16_1$-$16_N$ to the corresponding one of the bit positions $21_1$-$21_N$ in the interrupt vector register 22, via a signal on a corresponding one of the control lines $31_1$-$31_N$. The interrupt vector register 22 has a plurality of, here N bit positions, each one being coupled to a corresponding one of the OR logics $16_1$-$16_N$, respectively The interrupt vector register 22 stores the current interrupt servicing requirements, with each set bit in such interrupt vector register 22 indicating that the corresponding one of the interrupt classes requires servicing.

Each one of the plurality of interrupt holding registers $14_1$-$14_N$ has M+1 interrupt source bits and all these bits would represent an interrupt class that is uniquely identified by an interrupt vector ID. Each of the M+1 bits in each one of the N registers are ORd in a corresponding one of the N, OR logic blocks $16_1$-$16_N$, as shown. Here, an interrupt source that is in need of servicing has the corresponding bit set with logic 1. When any source bit of a particular class of interrupt gets set, the OR logic connected to the interrupt holding register storing such interrupt class generates a logic 1 pulse to the MSI_X generation logic 18. (It is noted that the OR logics s $16_1$-$16_N$ are edge detection logics). Therefore, each OR logic $16_1$-$16_N$ represents a unique MSI_X identification, i.e., interrupt vector ID. Further, it should be noted that the OR logic blocks $16_1$-$16_N$ operate independent of each other. Therefore, it is possible to have a scenario where some or all the OR logic blocks $16_1$-$16_N$ provide a logic 1.

It is noted that the MSI_X generation logic 18 has many inputs coming into it and one output connecting to the posted write queue 24. The functionality of the MSI_X generation logic 18 is to schedule (i.e., post) these interrupt vector IDs to the posted write queue 24. Example, if three inputs to the MSI_X generation logic 18 are set at the same time, say one from interrupt holding register $14_1$, another from register $14_2$ and a third from register $14_N$, the MSI_X generation logic 18 would post the interrupt vector ID for the interrupt class associated with register $14_1$ to the posted write queue 24, followed by interrupt vector ID for the interrupt class associated with register $14_2$, followed by interrupt vector ID for the interrupt class associated with register $14_N$. It is to be noted that the posted write queue 24 holds interrupt vector IDs as well as normal data traffic coming from the write data source 28.

The read response queue 26 stores the read response for reads from the interrupt vector register 22 as well as from the interrupt holding registers $14_1$-$14_N$. Both of these queues 24 and 26 must arbitrate to obtain access to the merge queue 36. Such arbitration is performed by merge queue arbiter 32 and pass through the arbiter selector 30. The output of the arbiter selector is fed to the merge queue 36 through the MSI_X detection logic 34. The CPU 38 is coupled to the merge queue 36, as shown.

It is noted that each one of the OR logic blocks $16_1$-$16_N$ is connected to a corresponding one of the interrupt copy logics $20_1$-$20_N$. Each one of the interrupt copy logics $20_1$-$20_N$ is a gate for passing the earlier detected state transition (logic 0 to logic 1 state transition) of the connected output of the OR logic blocks $16_1$-$16_N$ to a corresponding bit location in the interrupt vector register 22 when such corresponding one of the interrupt copy logics $20_1$-$20_N$ is enabled by a signal from the MSI_X detection logic 34 on one of the lines $31_1$-$31_N$. More particularly, the MSI_X detection logic 34 indicates (here using "wait for commit" signals), the appropriate one of the interrupt copy logics $20_1$-$20_N$ that a particular interrupt vector ID has passed through the MSI_X detection logic 34 on its way to the CPU 38 for processing. That is, the MSI_X detection logic 34 indicates when an interrupt vector ID has passed from the posted write queue 24 to the CPU 38.

When the interrupt copy logic $20_1$-$20_N$ receives the "wait for commit" signal from the MSI_X detection logic 34, the interrupt copy logic $20_1$-$20_N$ that received the "wait for commit" signal then passes the earlier detected state transition of the OR logic blocks $16_1$-$16_N$ to the corresponding bit in the interrupt vector register 22. There is one "wait for commit" indicator per "interrupt copy logic" $20_1$-$20_N$. Thus, in this example there are N "wait for commit signals".

The interrupt vector register 22 has N bits; each bit represents an interrupt class. Therefore, the interrupt vector register 22 acts as a summary of all interrupt classes and it could be read by the CPU 38 at any time independently of the operation of the posted write queue 24. The reason for reading the interrupt vector register 22 is to obtain a snap shot of all the pending interrupt messages (one message per class) that has been sent to the CPU 38 for processing. Therefore, it is vital from the system perspective to make sure that the interrupt message for a given interrupt class has been sent to the CPU 38 before its corresponding bit in the interrupt vector register 22 is set. Once the CPU 38 determines the class of received interrupt and if the CPU 38 wants to further determine the source of the interrupt, then it could read the interrupt holding registers $14_1$-$14_N$.

Thus, with the system 10 in FIG. 2, the "wait for commit" indicates that the merge queue arbiter 32 has selected the posted write queue entry (interrupt vector ID) to be placed in the "merge queue" 36. The merge queue entries are eventually scheduled to be sent to the CPU 38. On any given interrupt event, the event is initially captured in the appropriate one of the interrupt holding registers $14_1$-$14_N$. The merge queue arbiter 32 arbitrates between accesses by the entries in the posted write queue 24 and entries in the read response queue 26. When the merge queue arbiter 32, grants the posted interrupt message, the MSI_X detection logic 34 generates the "wait for commit signal". The "wait for commit" signal is a qualifier for enabling the interrupt copy logic $20_1$-$20_N$ Doing so should always guarantee that the read of the interrupt vector register 22 returns the current state of the outstanding interrupt classes requiring service, and their corresponding interrupt vector IDs has been sent to the CPU 38.

More particularly, in operation, the CPU 38 receives an interrupt vector ID that was written into the "posted write queue". The MSI_X detection logic 34 enables the bit corresponding to the interrupt vector ID identified by the MSI_X detection logic 34 to be set in the interrupt vector register 22. Thus, the register 22 is updated and stores the current state of the interrupt vector ID only after the received interrupt class was passed to the CPU 38. When the CPU 38 reads the bits in the "interrupt vector register" 22 the data in register 22 includes only interrupt classes that have passed to the CPU 38. For each bit that is set in the "interrupt vector register" 22, the CPU 38 should, therefore have received the corresponding interrupt vector ID from the write queue 24, before the read response of the interrupt vector register 22 with that particular bit set, is passed to the CPU. Based on the bits set in the "interrupt vector register" 22, the CPU is able to then read the corresponding interrupt holding register, or registers to determine the source of the interrupt.

Figure 3:
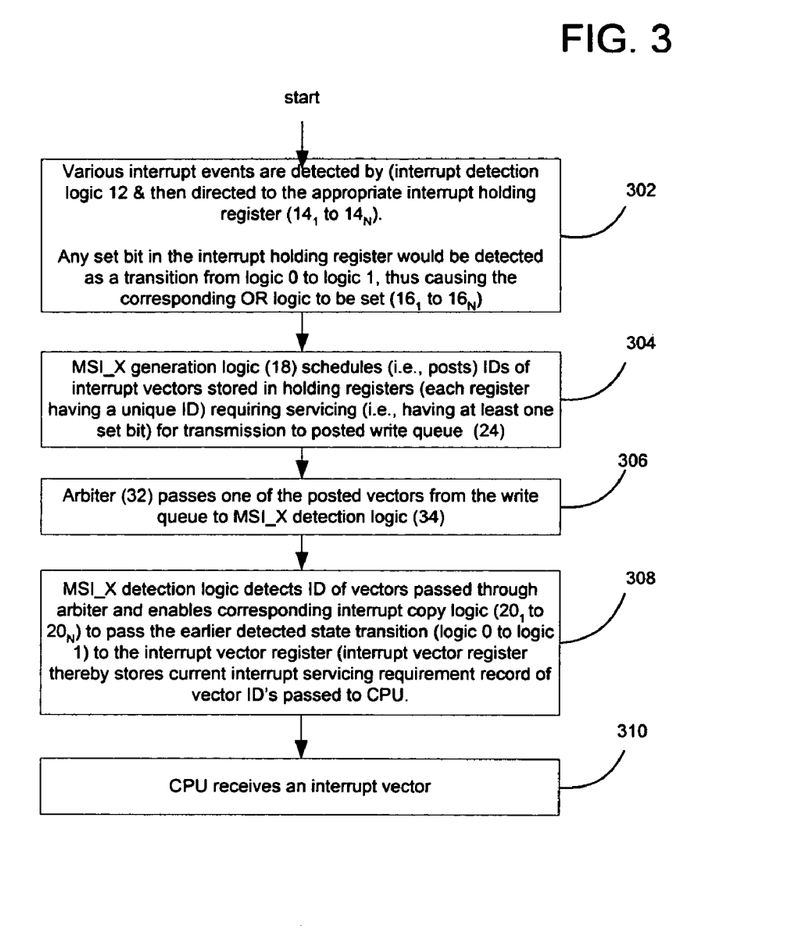
FIGS. 3 and 4 are flow diagrams of the process used by the interrupt processing system of FIG. 2.

Thus, referring to FIG. 3, the operation of the system in passing interrupt vector IDs to the CPU 38 is as follows:

In Step 302, various interrupt sources/events are detected by the interrupt detection logic 12 and then such interrupts are directed to and stored in the appropriate interrupt holding registers $14_1$-$14_N$, Step 302. It should be noted that the mapping of interrupt sources/events into the various interrupt holding registers, thus creating interrupt classes, are design specific and could vary from design to design. Each one of the interrupt holding registers $14_1$-$14_N$ has a unique identification number (ID). Any set bit in one of the interrupt holding registers $14_1$-$14_N$ would be detected as a transition from a logic 0 to a logic 1, thus causing the corresponding one of the OR logics $16_1$-$16_N$, respectively, to provide a logic 1 pulse to the MSI_X generation logic 18.

In Step 304, the MSI_X generation logic 18 detects the logic 1 pulse of the OR logics $16_1$-$16_N$ and schedules (i.e., posts) the identification numbers (IDs) of the interrupt vector IDs stored in interrupt holding registers $14_1$-$14_N$ having at least one set bit for transmission to the posted write queue 24.

In Step 306, the merge queue arbiter 32 passes one of the posted interrupt vector IDs from the posted write queue to the MSI_X detection logic 34 via arbiter selector 30, Step 306.

In Step 308, the MSI_X detection logic 34 detects the interrupt vector ID of the interrupt passed through the arbiter selector 30 and enables the interrupt copy logic $20_1$-$20_N$ corresponding to the selected interrupt vector ID to pass the earlier detected state transition (logic 0 to logic 1) in the corresponding one of the OR logics $16_1$-$16_N$ to the corresponding one of the bit positions $21_1$-$21_N$ in the interrupt vector register 22. The interrupt vector register 22 thereby stores the current interrupt servicing requirements. The interrupt vector IDs are passed from the MSI_X detection logic 34 to the merge queue 36 and then to the CPU 38. It is noted that data in the interrupt register 22 passes through the read response queue 26 when the CPU 38 reads the interrupt vector register.

In Step 310, the interrupt vector ID stored in the merge queue 36 is sent to the CPU 38.

Figure 4:
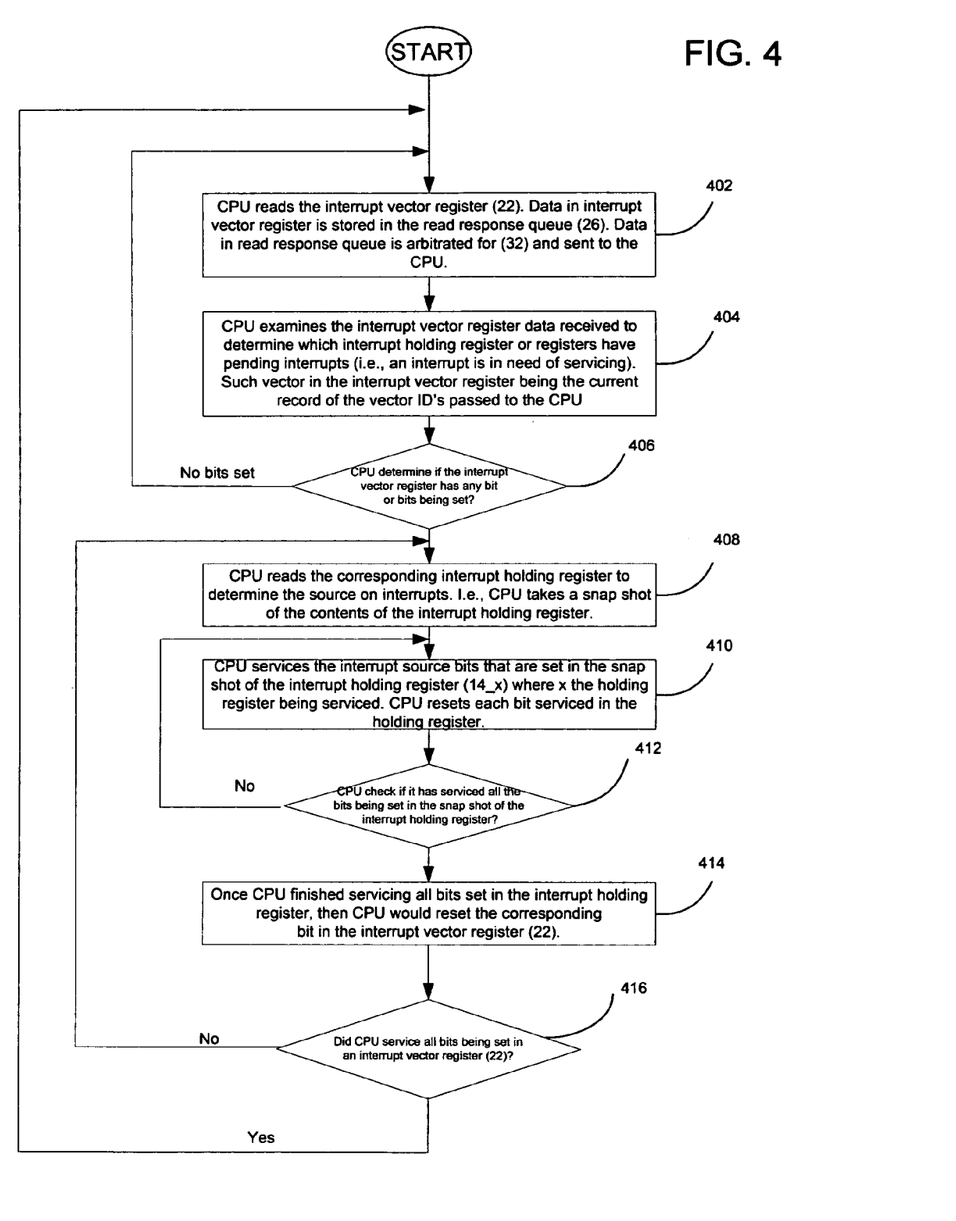

Referring now to FIG. 4, the operation of the CPU 38 is asynchronous with the process described above and is as follows:

In Step 402, after the CPU 38 receives an interrupt vector ID, the CPU 38 reads the interrupt vector register 22. Data in interrupt vector register 22 is stored in the read response queue 26. Data in read response queue 26 is arbitrated for by merge queue arbiter 32 and pushed into the merge queue 36 then forwarded from the merge queue 36 to the CPU 38.

In Step 404, the CPU 38 examines the interrupt vector register 22 to determine which interrupt holding register or registers have pending interrupts (i.e., an interrupt requiring service). It is again noted that the interrupt vector register 22 always stores the current servicing requirement for all the interrupt classes. Thus, the data in the interrupt vector register 22 is the current record of the interrupt vector IDs requiring servicing and have been passed to the CPU 38.

In Step 406, the CPU determines if the interrupt vector register 22 has any bit or bits being set. If the CPU 38 determines that there are no bits set, the process returns to Step 402. On the other hand, if the CPU 38 determines that there is at least one set bit in the data the CPU 38 has received from the interrupt vector register 22, the CPU reads the one of the interrupt holding registers $14_1$-$14_N$ corresponding to the set one of the bit positions $21_1$-$21_N$ to determine, from the set bit in such corresponding one of the holding registers $14_1$-$14_N$, the source of the interrupt.

In Step 408, the CPU 38 reads the corresponding interrupt holding register $14_1$-$14_N$ to determine the source of the interrupt, i.e., the CPU 38 takes a snap shot of the contents of the interrupt holding register $14_1$-$14_N$. This process is performed sequentially for each one of the set bits in the interrupt vector register 22.

Figure 5:
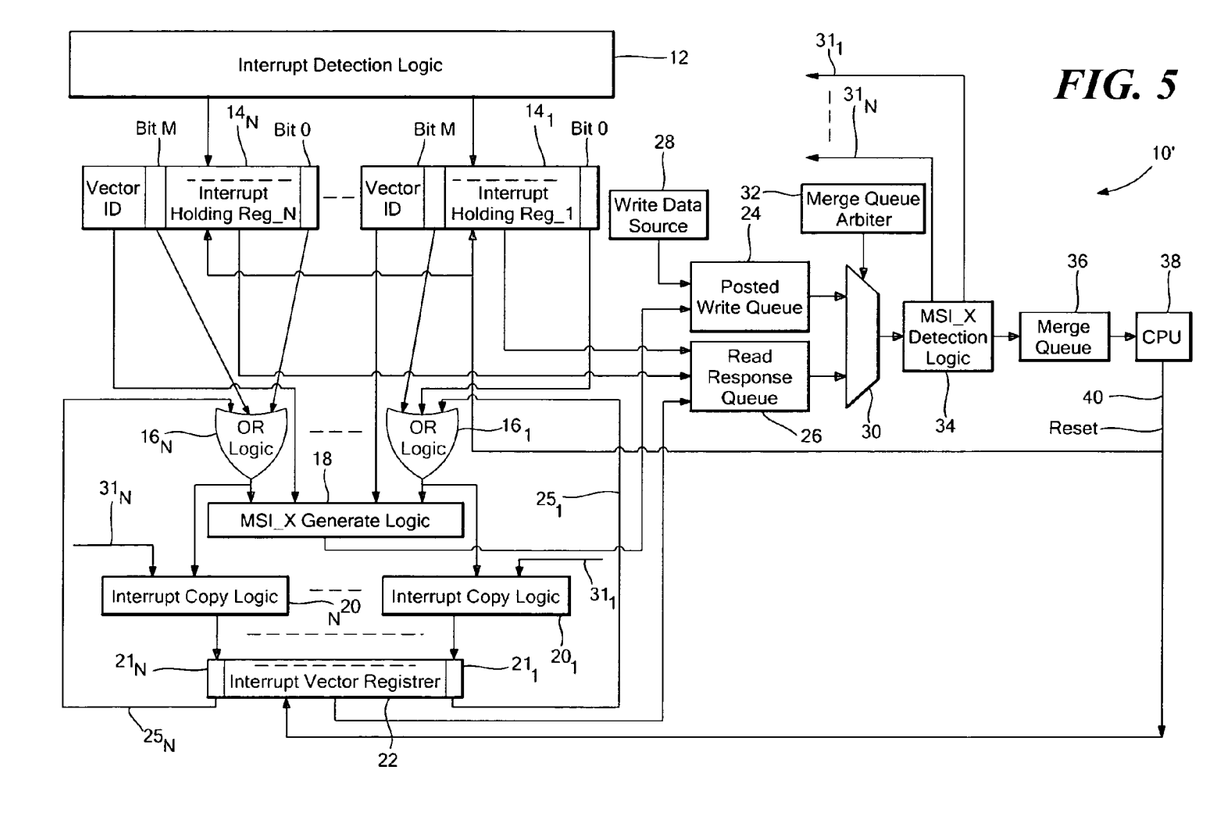
FIG. 5 is a diagram of an interrupt processing system according to another embodiment of the invention.

In Step 410, the CPU 38 services the determined interrupt sources. That is, the CPU 38 services the interrupt source bits that are set as determined from the snap shot of the contents of the interrupt holding registers, i.e., interrupt holding register 14x where x is the interrupt holding register being serviced. The CPU 38 resets each bit of the interrupt holding register that has been serviced on line 40 (as shown in FIG. 5).

In Step 412, the CPU 38 checks if it has serviced all bits set as determined by the snap shot of the interrupt holding register. Once all interrupt sources are serviced for a given interrupt holding register $14_1$-$14_N$, the CPU 38 proceeds to Step 414.

In Step 414, the CPU 38 resets the bit in the corresponding one of the bit positions $21_1$-$21_N$ in the interrupt vector register 22.

In Step 416, the CPU 38 check to determine if it has serviced all the bits set in the snap shot of the interrupt vector register 22. If the CPU 38 determines that all the set bits in the snap shot of the interrupt vector register 22 has been serviced, it will return to Step 402, else if will return to Step 408.

Referring now to FIG. 5, an interrupt system 10' is shown. Such system 10' is similar to the system 10 in FIG. 2, except that, here, each one of the OR logics $16_1$-$16_N$ includes both rising edge detectors 60 and falling edge detectors 62 as shown in FIG. 6 for an exemplary one of the identical OR logics $16_1$-$16_N$, here OR logic $16_1$.

Figure 6:
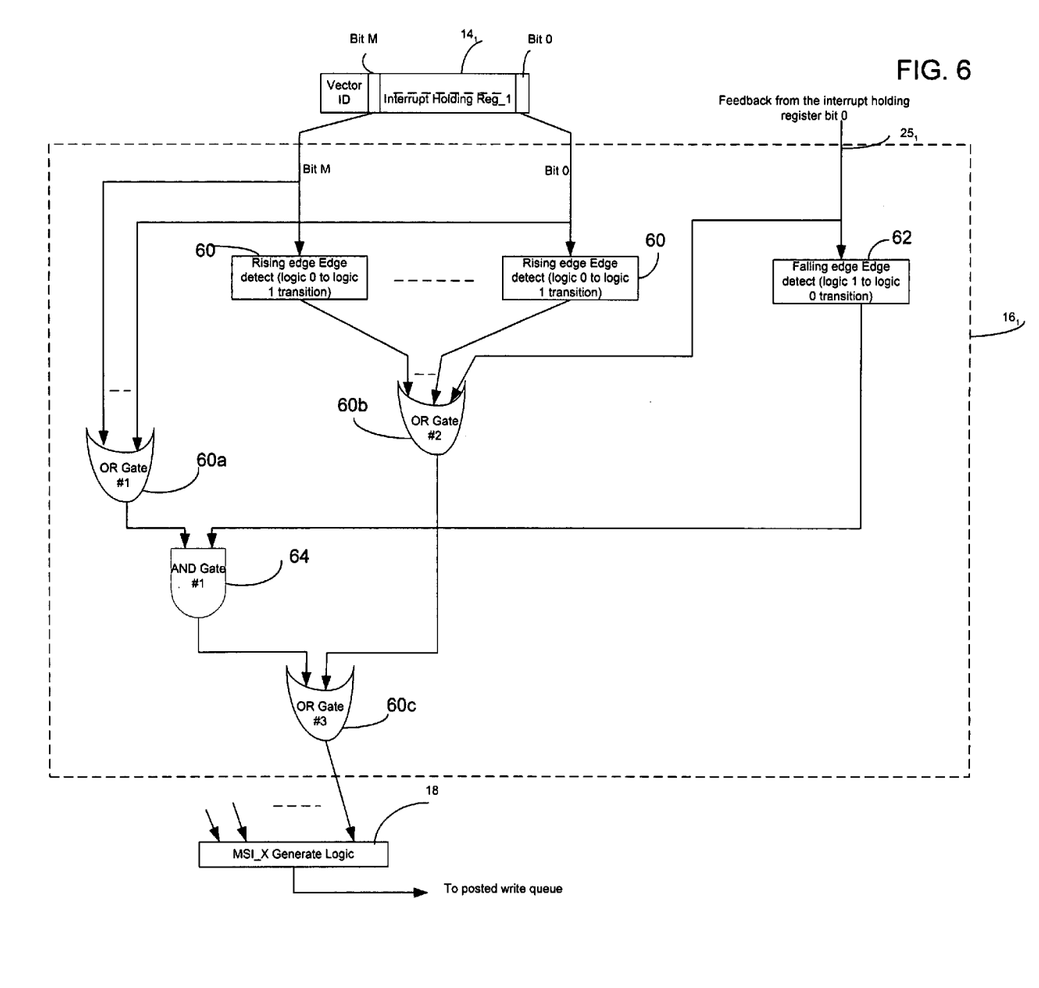
FIG. 6 is a diagram of an interrupt processing system according to yet another embodiment of the invention.

Thus, referring to FIG. 6, the OR logic $16_1$ includes three OR gates; i.e., OR gate #1 60a, OR gate #2 60b, and OR gate #3 60c and one AND gate 64. OR gate 60a is fed by the bits, bit 0 through bit M, of holding resister $14_1$. OR gate 60b is fed by the bits, bit 0 through bit M, of holding resister $14_1$ through a corresponding one of the plurality of rising edge detectors 60. It is noted that a rising edge detector detects logic 0 to logic 1 transition. OR gate 60b is also fed by a feedback signal $25_1$, to be described. It is noted that a falling edge detector detects a transition from logic 1 to a logic 0 of the feedback signal $25_1$. The output of the OR gate 60a is fed as an input to an AND gate 64 along side with the output of the falling edge detection 62 as the other input to the AND gate 64. The output of AND gate 64 and the output of OR gate 60b are fed as inputs to OR gate 60c. The output of OR gate 60c provides the output of OR logic $16_1$ and such OR gate 60c output is therefore is fed to the MSI_X detection logic 18 as described above in connection with FIG. 5 as well as to the corresponding one of the interrupt copy logics, here interrupt logic copy $20_1$.

Referring now again to FIG. 5 as described above in connection with FIG. 2, for every interrupt source/event in any of the interrupt holding registers $14_1$-$14_N$ that gets set, such would result in the output of the OR logic to provide a logic 1 pulse to the MSI_X generation logic 18 which, in turn, would result in an interrupt vector being generated to the CPU 38. For example, considering interrupt holding register $14_1$, if bit location 0 is set, then an interrupt vector ID would be scheduled in the posted write queue to be sent to the CPU 38 and bit location 0 of the interrupt vector register 22 would be set. Consequently, the CPU 38 will be notified about this interrupt class. Assume, however, that the CPU 38 hasn't yet serviced this interrupt (e.g., it is busy doing something else) and another bit location, say bit location 1 in the same interrupt holding register, here interrupt holding register $14_1$ gets set.

With the system 10 in FIG. 2, this would cause the OR logic to provide another logic 1 pulse to the MSI_X generation logic 18 resulting in another, i.e., duplicate, interrupt vector being sent to the CPU 38. The same would happen if bit location 2, bit location 3, bit location M are set. Therefore, the CPU 38 continues to receive duplicate interrupt vectors for the same interrupt class that hasn't been yet serviced. This would result in unnecessary system traffic. In reality the CPU 38 only needs to be notified once. All the other notifications are redundant and cause unnecessary system traffic.

With the system 10' in FIG. 5, there is a connection from the interrupt vector register 22 to the OR logics $16_1$-$16_N$. Each bit in the interrupt vector register 22 is connected (i.e., fed back $25_1$-$25_N$.) to its corresponding OR logics $16_1$-$16_N$, i.e., interrupt vector bit location 0, $21_1$ is connected by feedback connection $25_1$ to OR logic $16_1$, etc. With such an arrangement, OR logics ignores the inputs coming to it from the interrupt holding register if the feedback connection $25_1$-$25_N$ is set (i.e., the feedback connection acts like a mask). Once a bit in the interrupt vector register 22 is set (which means that the there is an outstanding interrupt vector that has been sent to the CPU 38 and the CPU 38 hasn't serviced that interrupt yet), then the fact that the interrupt vector bit is set, serves as a mask for this class of interrupts. Therefore, once an interrupt vector in the interrupt vector register 22 is sent to the CPU 38, the fact that is was sent and that the CPU 38 hasn't serviced that interrupt yet, the system 10' in FIG. 5 prevents more interrupts of the same class from being sent to the CPU 38, thus preventing duplicate interrupts.

Further, to ensure speedy notification of new interrupt sources to the CPU 38 via an interrupt vector, the OR logic $16_1$-$16_N$ shown in FIG. 6 includes, the falling (i.e., trailing) edge detector 62 on the state of the interrupt vector register feedback connection $25_1$-$25_N$. Upon the transition of the interrupt vector register feedback connection $25_1$-$25_N$, the trailing edge detector 62 enables the corresponding OR logics $16_1$-$16_N$ to check for any set bit (s) in the corresponding interrupt holding register $14_1$-$14_N$. Under this circumstance, if any bit (s) in the interrupt holding register $14_1$-$14_N$ is set, the system ensures that any un-serviced interrupt source/event or any new interrupt source/event that have occurred are notified to the CPU 38 (by the interrupt vector ID associated with the interrupt holding register) immediately after the software has indicated that it has serviced all outstanding interrupt sources/events for this particular interrupt class by resetting the corresponding bit in the interrupt vector register 22.

Figure 7:
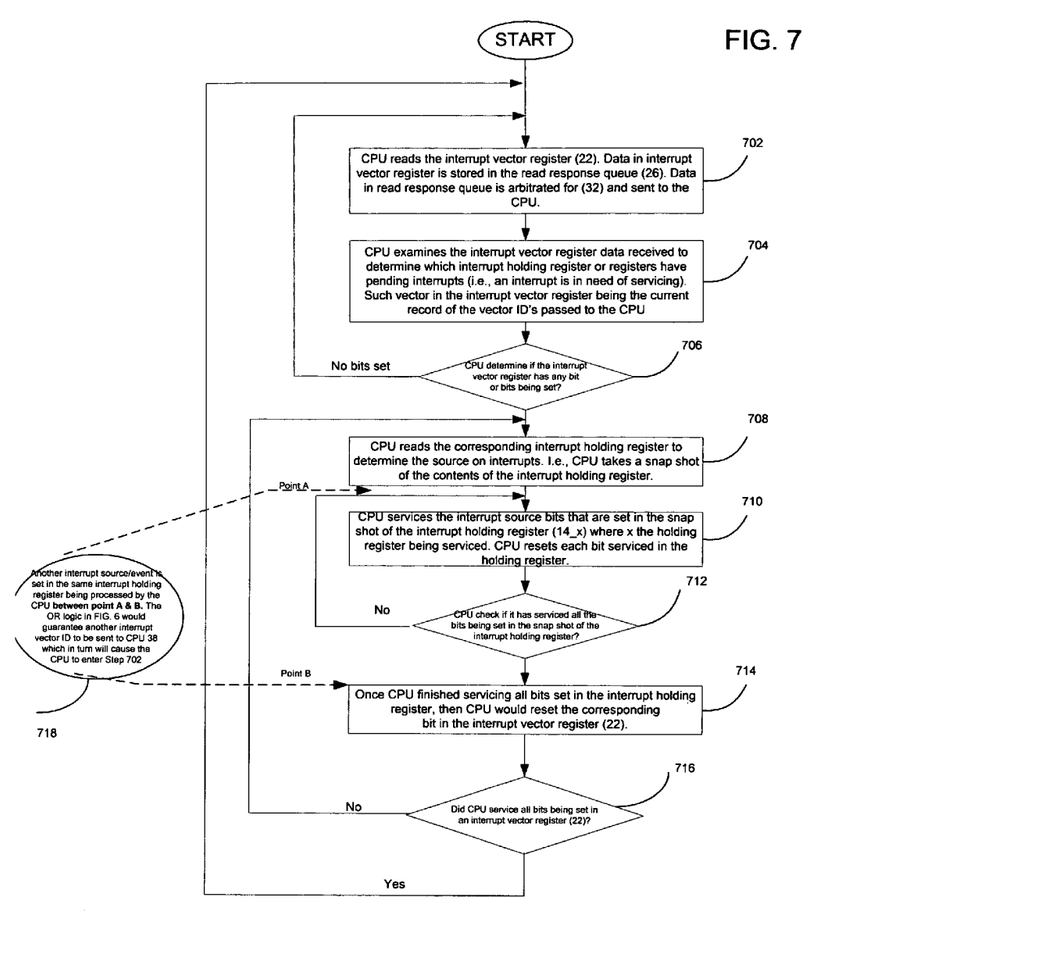
FIG. 7 is a flow diagram of the process used by the interrupt processing system of FIG. 6.

More particularly, referring to FIG. 7, the operation of the CPU 38 is asynchronous with the process described above and is as follows:

In Step 702, after the CPU 38 receives an interrupt vector ID, the CPU 38 reads the received interrupt vector register 22. Data in interrupt vector register 22 is stored in the read response queue 26. Data in read response queue is arbitrated for by arbiter 32 and sent to the CPU 38.

In Step 704, the CPU 38 examines the interrupt vector register 22 to determine which interrupt holding register or registers have pending interrupts (i.e., an interrupt requiring servicing). It is again noted that the interrupt vector register 22 always stores the current interrupt servicing requirements. Thus, the data in the interrupt vector register 22 is the current record of the vector IDs requiring servicing and passed to the CPU 38.

In Step 706, the CPU determines if the interrupt vector register has any bit or bits being set. If the CPU 38 determines that there are no bits set, the process returns to Step 702. On the other hand, if the CPU 38 determines that there is at least one set bit, the CPU 38 received from the interrupt vector register 22, the CPU reads the one of the interrupt holding registers $14_1$-$14_N$ corresponding to the set one of the bit positions $21_1$-$21_N$ to determine, from the set bit in such corresponding one of the holding registers $14_1$-$14_N$, the source of the interrupt.

Step 708, That is, the CPU 38 reads the corresponding interrupt holding register to determine the source of the interrupt, i.e., the CPU takes a snap shot of the contents of the interrupt holding register. This process is performed sequentially for each one of the set bits in such corresponding one of the holding registers $14_1$-$14_N$.

In Step 710, the CPU 38 services the determined interrupt sources. That is, the CPU 38 services the interrupt source bits that are set as determined from the snap shot of the contents of the vector holding registers, i.e., holding register $14x$ where x is the holding register being serviced. The CPU 38 resets each bit of the holding being serviced.

In Step 712, the CPU 38 checks if it has serviced all bits set as determined by the snap shot of the interrupt holding register. Once all interrupt sources are serviced for the that one of the holding register $14_1$-$14_N$ the CPU 38 first resets on line 40 (as depicted in FIG. 5) the serviced bits in the holding register, then the CPU 38 resets the bit in the corresponding one of the bit positions $21_1$-$22_N$ in the interrupt vector register 22, Step 714, and operation of the CPU 38 continues as described above in servicing interrupt it determines from subsequent vector IDs process the CPU 38 receives from the interrupt vector register 22, Step 716 and then the process returns to Step 702.

As noted in the circled region 718 represents another interrupt source/event being set after the CPU 38 had read the interrupt holding register and before the CPU resets the bit in the interrupt vector register 22. Since interrupt sources are asynchronous in nature and they could happen at any point in time, having the OR logic as depicted in FIG. 6 would guarantee the CPU 38 is notified of any new interrupt sources/events upon the reset of the corresponding bit in the interrupt vector register 22, in Step 714, thus causing the CPU 38 to re-enter Step 702 to process the new interrupt sources/events.

A number of embodiments of the invention have been described. Nevertheless, it will be understood that various modifications may be made without departing from the spirit and scope of the invention. Accordingly, other embodiments are within the scope of the following claims.

What is claimed is:

1. An interrupt processing system, comprising:
   a plurality of interrupt holding registers, each corresponding to a different class of interrupts;
   a write queue for storing posted interrupt vector IDs from the interrupt holding registers for interrupt sources/events requiring service;
   an interrupt vector register having bit positions corresponding to different classes of interrupts;
   a read queue having inputs coupled to the plurality of interrupt holding registers and to the interrupt vector register;
   detection logic coupled between an arbiter selector, fed by the write and read queues, and a processor for: (a) indicating when interrupt has passed from the arbiter selector to the processor; (b) detecting the interrupt class of such passed interrupt; (c) enabling the one of the bit positions corresponding to the detected interrupt class in the interrupt vector register to store a state indicating the servicing requirement for such detected class of interrupt;
   wherein the data stored in the interrupt vector register is passed to the processor through the read queue and the arbiter selector; and
   wherein each one of the OR logics is fed by the bits stored in the corresponding one of the plurality of holding registers; and
   wherein each one of the OR logics forms a corresponding interrupt vector.

* * * * *